(12) United States Patent
Wong et al.

(10) Patent No.: US 12,739,509 B2
(45) Date of Patent: Sep. 15, 2026

(54) FIELD CURVATURE COMPENSATED SENSOR SHIFT IMAGE STABILIZATION

(71) Applicant: Google LLC, Mountain View, CA (US)

(72) Inventors: Calvin Kyaw Wong, Cupertino, CA (US); Dansik Yoo, Sunnyvale, CA (US); Huang Shan Fu, New Taipei City (TW)

(73) Assignee: Google LLC, Mountain View, CA (US)

( * ) Notice: Subject to any disclaimer, the term of this patent is extended or adjusted under 35 U.S.C. 154(b) by 13 days.

(21) Appl. No.: 19/027,755

(22) Filed: Jan. 17, 2025

(65) Prior Publication Data

US 2026/0214333 A1 Jul. 23, 2026

(51) Int. Cl.
*H04N 23/68* (2023.01)
*H04N 23/54* (2023.01)
*H04N 23/51* (2023.01)
*H04N 23/57* (2023.01)

(52) U.S. Cl.
CPC ........... *H04N 23/687* (2023.01); *H04N 23/54* (2023.01); *H04N 23/51* (2023.01); *H04N 23/57* (2023.01)

(58) Field of Classification Search
CPC ........ H04N 23/50; H04N 23/51; H04N 23/54; H04N 23/57; H04N 23/685; H04N 23/687
See application file for complete search history.

(56) References Cited

U.S. PATENT DOCUMENTS 7,064,789 B1 * 6/2006 Shono .................... H04N 23/51 348/E5.026
8,248,497 B2 * 8/2012 Tanimura ................. G03B 5/00 348/208.99
10,958,838 B2 3/2021 Keal
11,044,389 B2 * 6/2021 Nozaki .................. H04N 23/60
2004/0252227 A1 * 12/2004 Seo ........................ H04N 23/54 348/375
2009/0091832 A1 * 4/2009 Nagai .................... H04N 23/54 359/557
2015/0010296 A1 1/2015 Yasuda
2016/0316120 A1 * 10/2016 Gintsburg ............ H04N 23/698
2020/0288060 A1 9/2020 Grenet
2022/0221734 A1 7/2022 Kim et al.
(Continued)

FOREIGN PATENT DOCUMENTS

WO 2020022026 A1 1/2020

OTHER PUBLICATIONS

International Search Report and Written Opinion of International Application No. PCT/US2025/053282 dated Feb. 9, 2026, 10 pp.

*Primary Examiner* — Daniel M Pasiewicz
(74) *Attorney, Agent, or Firm* — Shumaker & Sieffert, P.A.

(57) ABSTRACT

A device comprising: a camera housing; a first carrier; an image sensor carried by the first carrier; a second carrier, wherein: the first carrier is attached to the second carrier via a first plurality of objects that move within a first plurality of channels having first stroke axes that are not parallel to a plane of the image sensor, and the second carrier is attached to the camera housing via a second plurality of objects that move within a second plurality of channels having second stroke axes that are not parallel to both the plane of the image sensor and the first stroke axes; and one or more optical image stabilization (OIS) actuators configured to apply forces to move the first carrier along the first stroke axes and move the second carrier along the second stroke axes.

20 Claims, 8 Drawing Sheets

(56) References Cited

U.S. PATENT DOCUMENTS

| | | | | |
|---|---|---|---|---|
| 2023/0164439 | A1* | 5/2023 | Jang | H04N 23/55<br>396/55 |
| 2023/0171497 | A1 | 6/2023 | Song et al. | |
| 2023/0224586 | A1 | 7/2023 | Lee et al. | |
| 2023/0288678 | A1 | 9/2023 | Bachar et al. | |

* cited by examiner

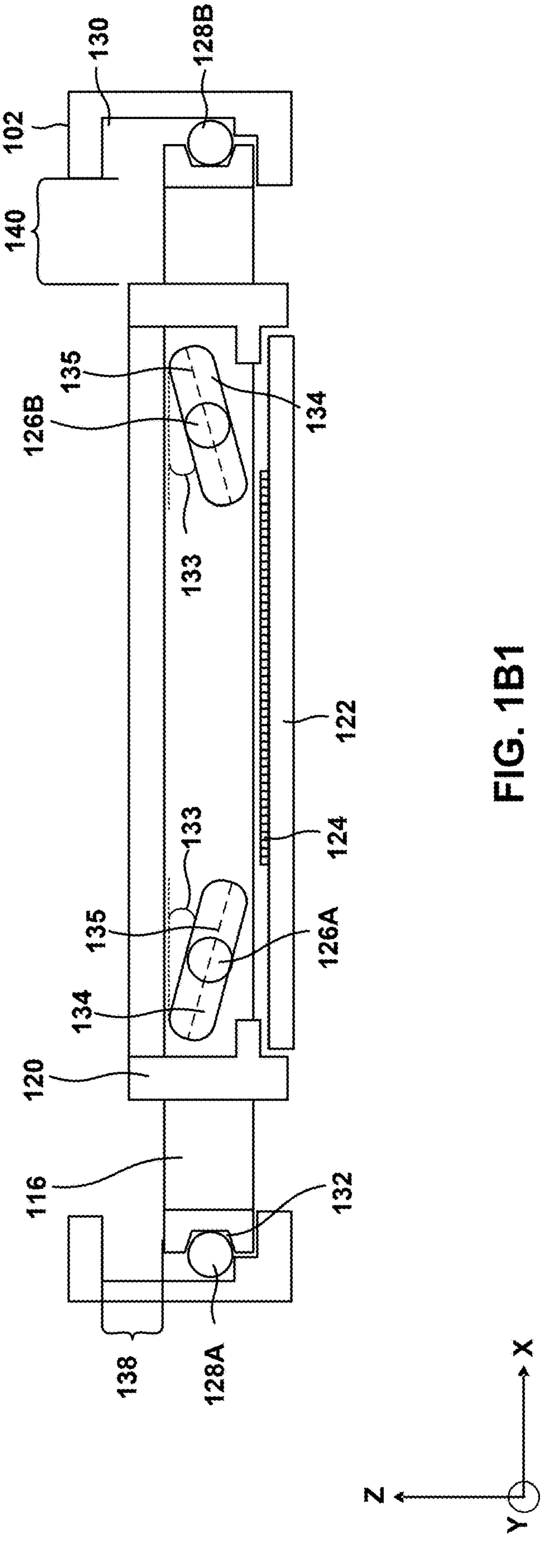
FIG. 1B1

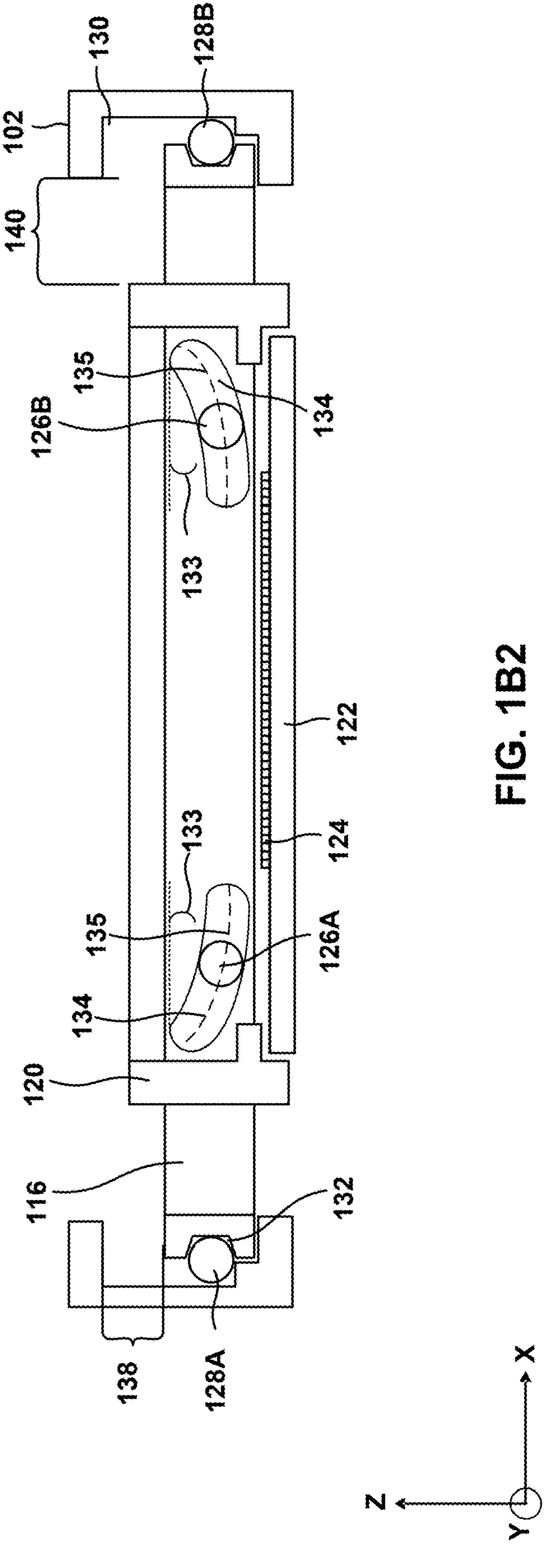
FIG. 1B2

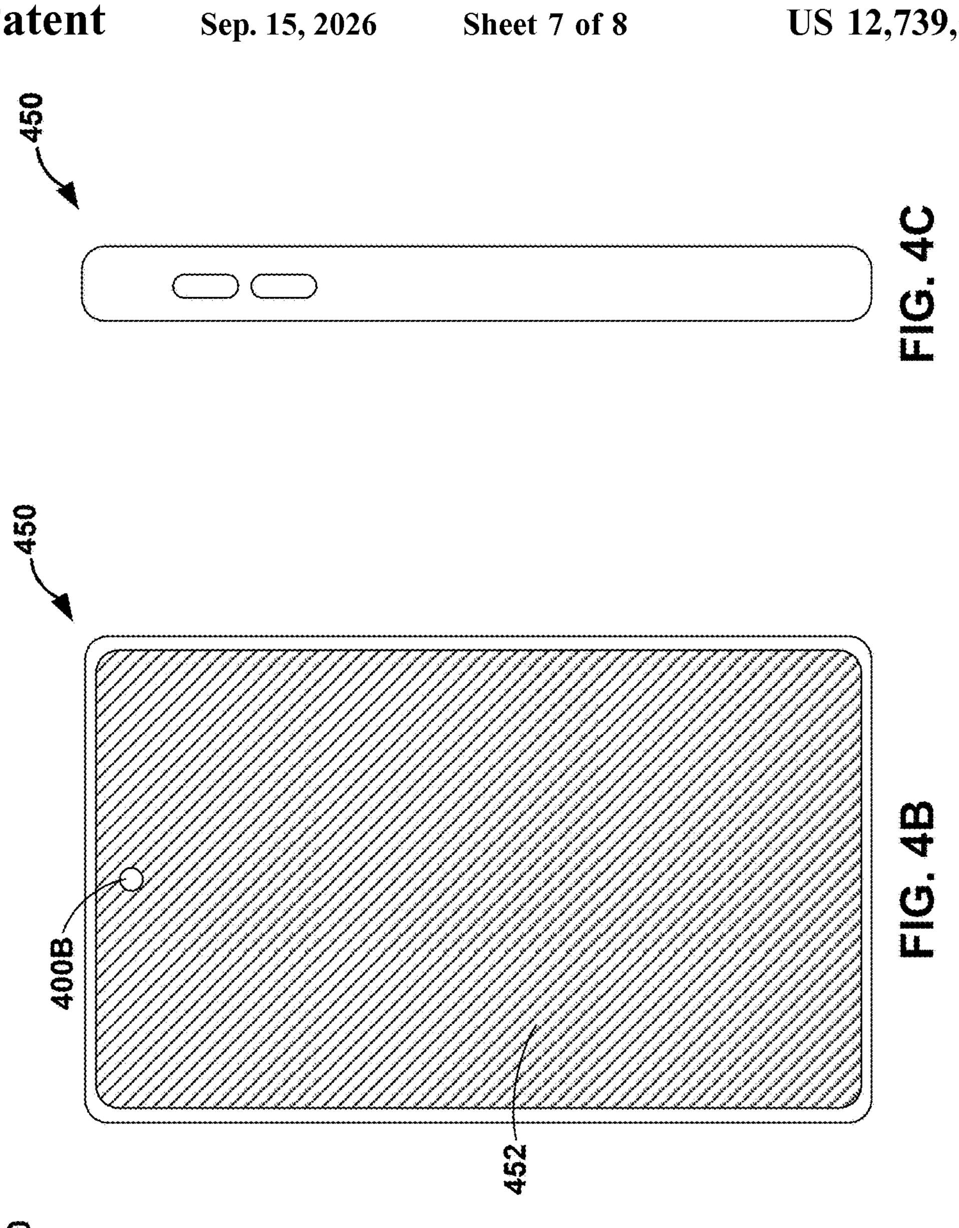
450
FIG. 4C
450
400B
452
FIG. 4B
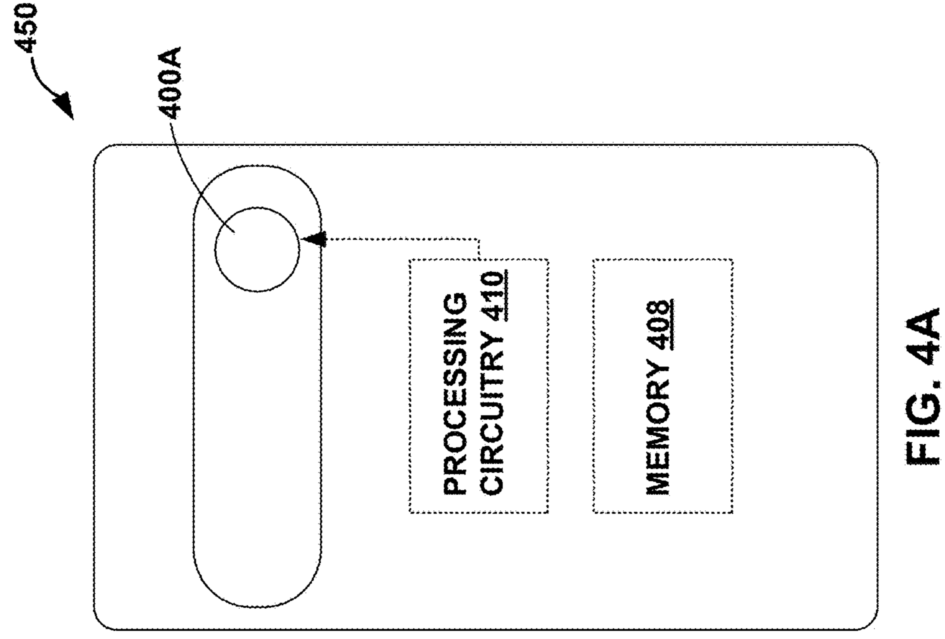
450
400A
PROCESSING CIRCUITRY 410
MEMORY 408
FIG. 4A

FIELD CURVATURE COMPENSATED SENSOR SHIFT IMAGE STABILIZATION

BACKGROUND

Mobile computing devices may include cameras to produce photos and videos. In some examples, movement of the camera while capturing a photo or video may result in a photo or video with undesirable effects (e.g., blur). To reduce the undesirable effects, caused by movement of the camera, mobile computing devices may include sensor shift image stabilization.

SUMMARY

In general, aspects of this disclosure are directed to a mobile computing device camera with a mechanism for field curvature compensated sensor shift image stabilization. Cameras of mobile computing devices may produce a photo or video by focusing light from the camera lens onto an image sensor. Light that passes through the camera lens is focused onto an imaging plane. Due to the curvature of the lens, the imaging plane is also curved. Geometry of the lens and the sensor may be arranged such that the curved imaging plane is coincident with the sensor at an optical center. However, the curved imaging plane may be vertically displaced from the sensor, with the displacement increasing with distance away from the center. This displacement between the imaging plane and the sensor may result in field curvature error, which may degrade the quality of photos or video captured via the sensor (e.g., degrading sharpness along the corners of the photo or video).

During normal use, the mobile computing device may move (e.g., due to being held in unsteady hands, on a moving vehicle, etc.) while the camera is capturing a photo or video. The movement of the camera may cause undesirable effects to the photo or video (e.g., blur). To counteract the movement of the camera and prevent the undesirable effects, the mobile computing device may perform optical image stabilization (OIS). In some examples, a mobile computing device camera may generally include a mechanism that shifts the image sensor to perform OIS. For instance, a sensor shift mechanism may move the image sensor opposite movement of the computing device, thereby canceling out said movement and stabilizing the image sensor.

Sensor shift mechanisms may include laterally stacked or vertically stacked carriers to carry the image sensor in planar directions (e.g., along the X, Y, and Z planes). Such designs may assist in providing image and video stabilization by shifting the image sensor in one or more planar directions. However, such designs may present one or more disadvantages. As one example, by shifting the image sensor in a planar direction, such designs may increase distances between the center and portions of the sensor capturing light. As discussed above, the greater the distance away from center light is captured, the greater the field curvature error.

In accordance with one or more aspects of this disclosure, a mobile computing device camera may include a mechanism for field curvature compensated sensor shift OIS that compensates for field curvature error while providing OIS. For instance, when performing OIS, the mechanism may both translate the sensor along a first direction and a second direction (e.g., that are parallel to a plane of the sensor) while also rotating the sensor. By rotating the sensor, the mechanism may enable the plane of the sensor to more closely match the image plane as the sensor is translated along the first and second directions. More closely matching the plane of the sensor with the image plane may decrease distances between the image plane and the sensor. In this way, the mechanism of this disclosure may desirably reduce field curvature error.

In one example, a device includes: a camera housing; a first carrier; an image sensor attached to and carried by the first carrier; a second carrier, wherein: the first carrier is attached to the second carrier via a first plurality of objects that move within a first plurality of channels having first stroke axes that are not parallel to a plane of the image sensor, and the second carrier is attached to the camera housing via a second plurality of objects that move within a second plurality of channels having second stroke axes that are not parallel to both the plane of the image sensor and the first stroke axes; and one or more optical image stabilization (OIS) actuators configured to apply forces to move the first carrier along the first stroke axes and move the second carrier along the second stroke axes.

In another example, a method includes: receiving, by one or more optical image stabilization (OIS) actuators and based on sensor data indicating movement of a device, a signal; and applying, by the one or more OIS actuators and based on the signal, one or more forces to move one or both of a first carrier and a second carrier, wherein: movement of one or both of the first carrier and the second carrier comprises both planar and rotational movement of an image sensor, the image sensor is attached to and carried by the first carrier, the first carrier is attached to the second carrier via a first plurality of objects that move within a first plurality of channels having first stroke axes that are not parallel to a plane of the image sensor, the second carrier is attached to the camera housing via a second plurality of objects that move within a second plurality of channels having second stroke axes that are not parallel to both the plane of the image sensor and the first stroke axes, and the first carrier moves along the first stroke axes and the second carrier moves along the second stroke axes.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIGS. 1A-1C are conceptual diagrams illustrating a mechanism for field curvature compensated sensor shift OIS, in accordance with one or more aspects of this disclosure.

FIGS. 4A-4C are conceptual diagrams illustrating an example mobile computing device, in accordance with one or more aspects of this disclosure.

DETAILED DESCRIPTION

Figure 1A:
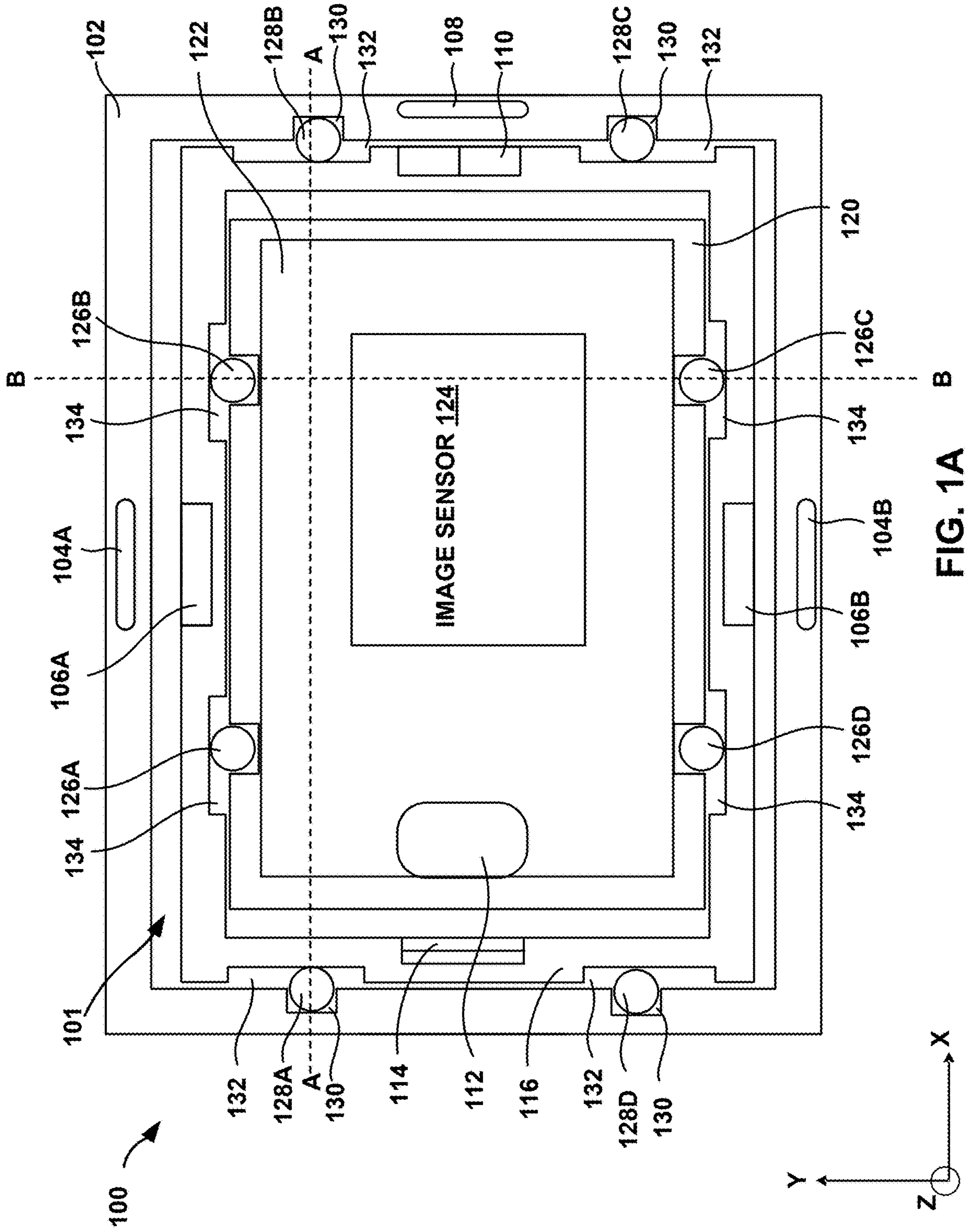
Figure 1C:
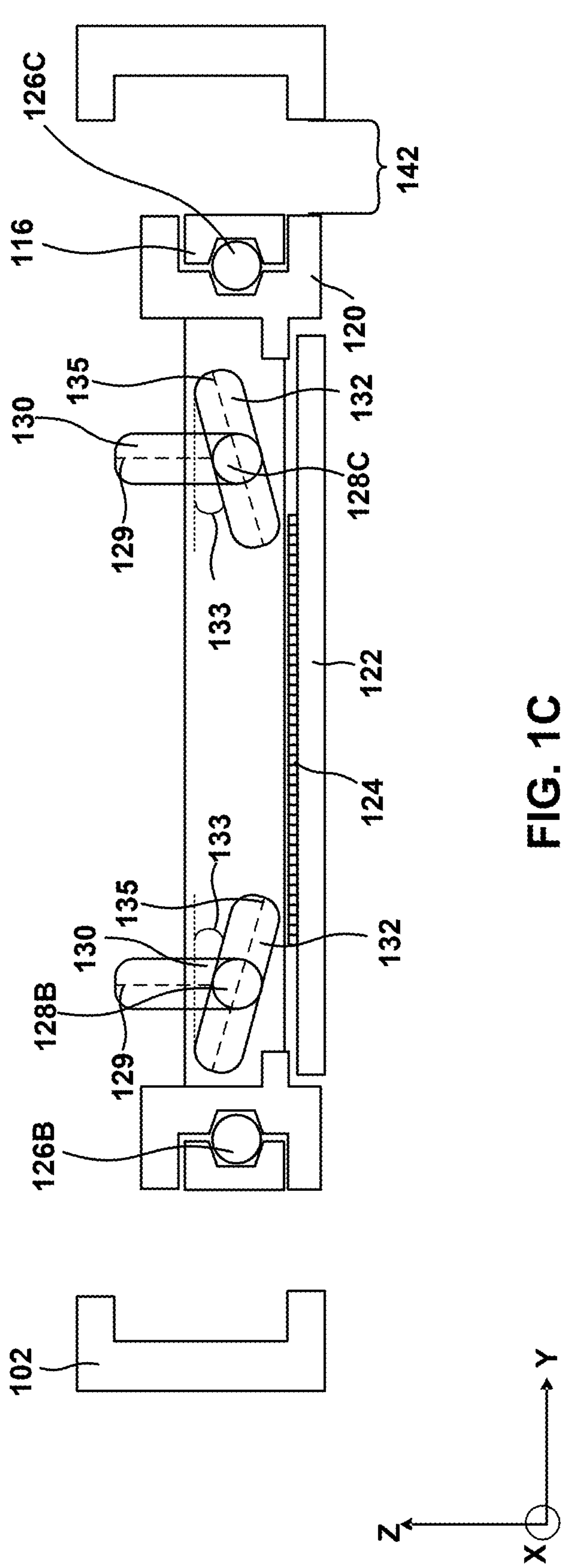

FIGS. 1A-1C are conceptual diagrams illustrating camera 100 that includes a mechanism 101 for field curvature compensated sensor shift OIS, in accordance with one or more aspects of this disclosure. Camera 100 may be included in any mobile computing device that includes a camera such as a smartphone, a foldable smartphone, a wearable device, a headset, a tablet, a gaming system, etc. Camera 100 may be referred to as a camera module or camera assembly.

FIG. 1A shows a top view of camera 100 looking down at the X-Y plane, FIGS. 1B1 and 1B2 show a cross-sectional view of camera 100 on the X-Z plane (e.g., along line A-A), and FIG. 1C shows a cross-sectional view of camera 100 on the Y-Z plane (e.g., along line B-B). Note that some features are shown in FIGS. 1B1, 1B2, and 1C that are not on the respective A-A and B-B lines, but nevertheless assist with explanation.

As shown in FIGS. 1A, 1B1, 1B2, and 1C, camera 100 may include camera housing 102 and field curvature compensated sensor shift OIS mechanism 101 (herein referred to as, "mechanism 101"). Camera housing 102 may include printed circuit board (PCB) 122, and image sensor 124. As also shown, mechanism 101 may include first carrier 120, second carrier 116, first objects 126A, 126B, 126C, and 126D (collectively, "first objects 126"), and second objects 128A, 128B, 128C, and 128D (collectively, "second objects 128"). First objects 126 and second objects 128 may be any type of object (e.g., a shaft) but for ease of explanation first objects 126 and second objects 128 are illustrated in FIGS. 1A-1C and FIGS. 2A-2B as ball bearings. Accordingly, first objects 126 may be referred to herein as "X ball bearings 126" and second objects 128 may be referred to herein as "Y ball bearings 128." For further ease of explanation, FIGS. 1A-1C and FIGS. 2A-2B show first carrier 120 configured to carry image sensor 124 in at least an X direction, accordingly first carrier 120 may be referred to herein as "X carrier 120." Similarly, FIGS. 1A-1C and FIGS. 2A-2B show second carrier 116 configured to carry image sensor 124 at least in a Y direction, accordingly second carrier 116 may be referred to herein as "Y carrier 116."

PCB 122 may be a circuit component on which image sensor 124 may be mounted. PCB 122 may include components that support operation of image sensor 124, such as connectors, circuit components, and the like. In one example, PCB 122 may include one or more of auto focus controller integrated circuits (ICs), OIS controller ICs, power management ICs, resistors, capacitors, and magnetic detection ICs (e.g., Hall effect sensors, tunnel-magnetoresistance sensors, giant-magnetoresistance sensors, etc.).

A camera lens may capture light from a scene (e.g., mountains, people, food, etc.) to produce a photo or video of the scene. The camera lens may focus the captured light onto image sensor 124. Image sensor 124 may include photosensitive cells (e.g., photodiodes) that may react to light, e.g., convert light into electrical signals. In some examples, image sensor 124 may be a Charge-Coupled Device (CCD) sensor, a Complementary Metal-Oxide-Semiconductor (CMOS) sensor, a Bayer Filter Array Sensor, etc. In some examples, PCB 122 may include other components such as an analog-to-digital converter (ADC), which may convert the electrical signals from image sensor 124 into digital data that represents the scene. One or more processors may be included in the mobile computing device to process the digital data and produce the final photo or video of the scene. Further, in some examples, PCB 122 may include a gyroscope, accelerometer, and/or other components to provide comprehensive motion data of the camera. In other examples, one or more of the components to provide comprehensive motion data of the camera are included outside of PCB 122 (e.g., on a main PCB of the mobile computing device located near one or more processors.).

In general, mechanism 101 may perform operations to perform optical image stabilization (OIS). For instance, mechanism 101 may move (i.e., shift) a position of image sensor 124 to compensate for movement of camera 100 relative to a scene being captured via camera 100. As discussed above, mechanism 101 may include Y carrier 116, X carrier 120, X ball bearings 126, and Y ball bearings 128.

In the example illustrated by FIG. 1A, Y carrier 116 includes four sides. In other examples, Y carrier 116 may include more or less than four sides. In one example, a side may be considered a line segment or boundary that contributes to the overall structure of a mechanism. In the example illustrated by FIG. 1A, the sides of Y carrier 116 that are parallel to each other may be substantially similar in length. In the example illustrated by FIG. 1A, Y carrier 116 may resemble the shape of a rectangle or a square. In another example (not illustrated by FIG. 1A), each side of Y carrier 116 may not be similar in length. Y carrier 116 may generally include sides that are longer in length than the sides of X carrier 120. In one example, Y carrier 116 may be responsible for carrying X carrier 120 (and thus image sensor 124) in a YZ direction (e.g., a direction with planar movement along the Y plane and angular movement/tilt along the Z plane). For instance, Y carrier 116 may carry X carrier 120 upwards in the Y direction and may tilt X carrier 120 such that a side of X carrier 120 that is perpendicular to the Y axis is carried upwards in the Z direction.

In the example illustrated by FIG. 1A, X carrier 120 includes four sides. In other examples, X carrier 120 may include more or less than four sides. In the example illustrated by FIG. 1A, the sides of X carrier 120 that are parallel to each other (e.g., the two sides across from each other) may be substantially similar in length. In the example illustrated by FIG. 1A, X carrier 120 may be generally rectangular. In another example (not illustrated by FIG. 1A), each side of X carrier 120 may not be similar in length. X carrier 120 may generally include sides that are shorter in length than the sides of Y carrier 116.

In one example, X carrier 120 may be responsible for carrying PCB 122 (and thus image sensor 124) in an XZ direction (e.g., a direction with planar movement along the X plane and angular movement/tilt along the Z plane). For instance, X carrier 120 may carry image sensor 124 to the right in the X direction and may tilt image sensor 124 such that a side of image sensor 124 that is perpendicular to the X axis is carried upwards in the Z direction. In some examples, PCB 122 may be attached to X carrier 120 via an adhesive (e.g., an epoxy adhesive, a silicon adhesive, an acrylic adhesive, double sided tape, etc.) and/or via mechanical components (e.g., screws, mounting clips, etc.).

Camera housing 102 may resemble Y carrier 116 and/or X carrier 120. For instance, housing 102 may have four sides and, in the example of FIG. 1A, be substantially rectangular. Like Y carrier 116 and X carrier 120, camera housing 102 is not limited to the shape or number of sides illustrated by FIG. 1A. However, unlike Y carrier 116 and X carrier 120, camera housing 102 may not be considered part of mechanism 101. Such that camera housing 102, does not move (e.g., carry) to facilitate OIS. Rather, camera housing 102 may provide protection and support for camera 100.

While camera housing 102 may not be included in mechanism 101, in some examples, housing 102 may be connected to Y carrier 116 via Y ball bearings 128, which are included in mechanism 101. In the example illustrated by FIG. 1A, four Y ball bearings 128 connect housing 102 to Y carrier 116 and vice versa. For instance, two Y ball bearings 128 are located next to each of the parallel sides of Y carrier 116 that are oriented parallel to the Y axis. In some examples, two Y ball bearings 128 may be located next to each of the parallel sides of Y carrier 116 that are oriented perpendicular to the Y axis. In one example, Y ball bearings 128 may facilitate movement of Y carrier 116 in the YZ and/or Z direction. Such that Y ball bearings may roll in the YZ direction or the Z direction. For instance, Y ball bearings may roll up or down along a stroke axis that is at an angle between the Y axis and the Z axis (e.g., at a negative or positive angle between 1 and 90 degrees relative to the Y axis).

In some examples, X carrier 120 may be connected to Y carrier 116 and vice versa via X ball bearings 126. In the example illustrated by FIG. 1A, X carrier 120 is connected to Y carrier 116 via four X ball bearings 126. For instance, two X ball bearings 126 are located next to each of the parallel sides of X carrier 120 that are oriented parallel to the X axis. In other examples, two X ball bearings 126 may be located next to each of the parallel sides of X carrier 120 that are oriented perpendicular to the X axis. In one example, X ball bearings 126 may facilitate movement of X carrier 120 in the XZ direction. For instance, X ball bearings may roll right or left along a stroke axis that is at an angle between the X axis and the Z axis (e.g., at a negative or positive angle between 1 and 90 degrees relative to the X axis).

In one example, Y carrier 116 may include first channels 134 (herein, "X channels 134") and second channels 132 (herein, "Y channels 132"). X ball bearings 126 may roll in X channels 134. X channels 134 may each have stroke axes along which X ball bearings 126 roll. The stroke axes of X channels 134 are not parallel to the plane of image sensor 124 (e.g., the ideal imaging plane). X channels 134 may serve as a boundary for movement of X carrier 120, such that X carrier 120 may only move (in the XZ direction) as far as X channels 134 allow X ball bearings 126 to roll. Similarly, Y ball bearings 128 may roll in Y channels 132. Y channels 132 may each have stroke axes along which Y ball bearings 128 roll. The stroke axes of Y channels 132 are not parallel to the plane of image sensor 124 (e.g., the ideal imaging plane). Further, the stroke axes of X channels 134 and the stroke axes of Y channels 132 may not be parallel to each other. Y channels 132 may serve as a boundary for movement of Y carrier 116, such that Y carrier 116 may only move (in the YZ direction) as far as Y channels 132 allow Y ball bearings 128 to roll. In another example, housing 102 may include Z channels 130 with stroke axes perpendicular to the plane of image sensor 124.

In another example, X carrier 120 and housing 102 may include indents (e.g., notches). X ball bearings 126 may reside within the indents of X carrier 120 and Y ball bearings 128 may reside within the indents of housing 102. The indents may be used to stabilize the ball bearings to facilitate movement of the carriers. For instance, X ball bearings 126 may reside within the indents of X carrier 120 such that when X carrier 120 moves in an XZ direction X ball bearings 126 may roll in place within the indents with respect to X carrier 120.

The channel to carrier arrangements and the arrangement of the indents of FIGS. 1A-1C are merely one possible arrangement. For instance, in another example, X carrier 120 may include X channels 134 and Y channels 132 and Y carrier 116 may include indents for X ball bearings 126 and/or Y ball bearings 128. Further, the use of ball bearings is just one example object that may be used to facilitate movement of X carrier 120 and Y carrier 116. In another example, a shaft or wire may be used instead of, or in combination with the ball bearings. Mechanism 101 may include one or more actuators that move X carrier 120 and/or Y carrier 116. For instance, mechanism 101 may include a first actuator that moves X carrier 120 along the stroke axes of X channels 134, and a second actuator that moves Y carrier 116 along the stroke axes of Y channels 132. In some examples, mechanism 101 may further include a third actuator that moves Y carrier 116 along the stroke axes of Z channels 130. These actuators may include any suitable electromechanical components, such as voice coil motors (VCMs), motors, and the like. As shown in FIGS. 1A-1C, mechanism 101 may include X coil 112, Y coil 108, and Z coils 104A and 104B (collectively, "Z coils 104"), X magnet 114, Y magnet 110, and Z magnets 106A and 106B (collectively, "Z magnets 106"). Each coil of mechanism 101 may correspond to (e.g., be located close to) a magnet of mechanism 101. For instance, in the illustrated example: the first actuator includes X coil 112 and corresponding X magnet 114; the second actuator includes Y coil 108 and corresponding Y magnet 110; and the third actuator includes the first Z coil 104A and corresponding Z magnet 106A, and the second Z coil 104B and corresponding Z magnet 106B.

In one example, a coil from mechanism 101 may be an electric conductor (e.g., a wire) in a spiral shape that uses an electric current to generate a magnetic field. Such that, a coil from mechanism 101 may generate an attraction or repulsion relationship with a magnet from mechanism 101.

Each coil of mechanism 101 may be responsible for moving image sensor 124 along one or more stroke axes. X coil 112 may be responsible for shifting image sensor 124 along the stroke axes of X channels 134 via X magnet 114. Y coil 108 may be responsible for shifting image sensor 124 along the stroke axes of Y channels 132 via Y magnet 110, and Z coils 104 may be responsible for shifting image sensor 124 along the stroke axes of Z channels 130 via Z magnets 106. The coil and magnet pairs may collectively be considered actuators and may operate to perform OIS. For instance, X coil 112 and X magnet 114 may be considered a first actuator or an X actuator, Y coil 108 and Y magnet 110 may be considered a second actuator or a Y actuator, and Z coils 104 and Z magnets 106 may be considered a third actuator or Z actuator. In some examples, the Z actuator may perform one or more operations to perform AF.

In some examples, motion data may be associated with an electric signal that is provided to one or more coils of mechanism 101. The electric signal may be used to direct movement of image sensor 124. For instance, camera 100 may move along the X axis (e.g., left or right) while capturing a photo. One or more gyroscopes, accelerometers, and/or other components (e.g., sensors) of the mobile computing device may collect sensor data (e.g., motion data) of camera 100. One or more processors and/or OIS controller ICs may generate a signal, based on the motion data, and provide the signal to an X actuator (e.g., that includes X coil 112 and X magnet 114). Receipt of the signal may cause the X actuator to move X carrier 120 (which includes image sensor 124) in the necessary direction (along the X axis) to counteract the movement of camera 100 and tilt X carrier 120 to the necessary angle (along the Z axis) to compensate for field curvature error. In one example, in response to receiving the signal, X coil 112 may generate a magnetic field that interacts with X magnet 114 to move X carrier 120 along the stroke axes of X channels 134.

In one example, one or more processors (illustrated 460 in FIG. 4) of a mobile computing device that includes camera 100 may cause X carrier 120 to move, via X coil 112 and X magnet 114, along the stroke axes of X channels 134 to perform OIS with compensation for field curvature error. In another example, one or more processors of a mobile computing device that includes camera 100 may cause Y carrier 116 to move, via Y coil 108 and Y magnet 110, along the stroke axes of Y channels 132 to perform OIS with compensation for field curvature error.

Camera 100 may produce a photo or video by focusing light from the camera lens onto image sensor 124. Light that passes through the camera lens is focused onto an imaging plane. Due to the curvature of the lens, the imaging plane is also curved. Geometry of the lens and image sensor 124 may be arranged such that the curved imaging plane is coincident with image sensor 124 at an optical center. However, the curved imaging plane may be vertically displaced from image sensor 124, with the displacement increasing with distance away from the center. This displacement between the imaging plane and image sensor 124 may result in field curvature error, which may degrade the quality of photos or video captured via image sensor 124 (e.g., degrading sharpness along the corners of the photo or video). Typical sensor shift OIS techniques may shift image sensor 124 in a planar direction such that distances between the center and portions of image sensor 124 capturing light are increased resulting in greater the field curvature error.

In accordance with one or more aspects of this disclosure, a camera 100 of a mobile computing device may include mechanism 101 for field curvature compensated sensor shift OIS that compensates for field curvature error while providing OIS. For instance, when performing OIS, mechanism 101 may translate image sensor 124 along a first direction and a second direction (e.g., an X direction and a Y direction that are both parallel to a plane of image sensor 124) while also rotating (e.g., tilting) image sensor 124.

Mechanism 101 may include X carrier 120 laterally stacked with Y carrier 116. Image sensor 124 may be attached to X carrier 120. In one example, X carrier 120 may move image sensor 124 in the XZ direction within Y carrier 116 via X ball bearings 126. In another example, Y carrier 116 may move in the YZ direction within housing 102 via Y ball bearings 128. In some examples, because X carrier 120 is laterally stacked within Y carrier 116 and attached to Y carrier 116 via X ball bearings 126, when Y carrier 116 moves in the YZ direction image sensor 124 moves in the YZ direction as well. Each carrier may include designated ball bearings, channels, magnets, and coils that facilitate movement in the carrier's respective direction(s). The channels may include stroke axes that are not parallel to the plane of image sensor 124, such that mechanism 101 may translate image sensor 124 in one or more planar directions (e.g., along the X and Y axis) while also rotating image sensor 124 (e.g., tilting image sensor 124 along the Z axis). By rotating image sensor 124, mechanism 101 may enable the plane of image sensor 124 to more closely match the image plane as image sensor 124 is translated along one or more planar directions. More closely matching the plane of image sensor 124 with the image plane may decrease distances between the image plane and image sensor 124. In this way, mechanism 101 may desirably reduce field curvature error.

FIG. 1B1 shows a cross-sectional view of camera 100 on the X-Z plane (e.g., along line A-A). Although line A-A of FIG. 1A goes through Y ball bearings 128A and 128B, X ball bearings 126A and 126B and X carrier 120 are shown to help facilitate understanding. As illustrated by FIG. 1B1, X carrier 120 may be laterally stacked within Y carrier 116.

X carrier 120 may carry PCB 122 (and thus image sensor 124). X carrier 120 may be configured to move in an XZ direction via X ball bearings 126 (e.g., ball bearings 126 support movement of X carrier 120 in an XZ direction). In some examples, as X carrier 120 moves in an XZ direction ball bearings 126A and 126B may roll within X channels 134. X channels 134 may be channels (e.g., passages or grooves) in Y carrier 116 that guide, direct, or accommodate X ball bearings 126. X channels 134 may be angled 133 (e.g., tilted) such that X carrier 120 may translate in an X direction while also rotating (e.g., tilting) about a Z direction. X channels 134 may include stroke axes 135 that represent the path along which X ball bearings 126 roll within X channels 134. Angle 133, and thus stroke axes 135, may be different for each of X channels 134. Further, X channels 134 may also serve one or more structural purposes, such as providing strength and or support to mechanism 101, while also allowing for movement or interaction of the carriers. Such that, to support movement of X carrier 120 in an XZ direction X ball bearings 126 move within X channels 134 along stroke axes 135.

The length of X channels 134 may generally serve as a boundary for how far X carrier 120 may move in an XZ direction. Such that, when X ball bearings 126 reach the end of X channels 134, X carrier 120 may no longer move any further in that XZ direction. The distance that X carrier 120 may move in an XZ direction may be illustrated by XZ stroke 140. In some examples, XZ stroke 140 may be associated with the length and angle 133 of X channels 134 and/or the distance between a side of Y carrier 116 and a side of X carrier 120 (parallel and proximal to the side of Y carrier 116).

Y carrier 116 may carry X carrier 120 (and thus image sensor 124). Y carrier 116 may be configured to move in a YZ direction via Y ball bearings 128 (e.g., ball bearings 128 support movement of Y carrier 116 in a YZ direction). In some examples, as Y carrier 116 moves in a YZ direction, ball bearings 128A and 128B may roll within Y channels 132. Y channels 132 may be channels (e.g., passages or grooves) in Y carrier 116 that guide, direct, or accommodate Y ball bearings 128. Y channels 132 may be angled (e.g., tilted) such that Y carrier 116 may translate in a Y direction (e.g., illustrated by FIG. 1B1 as in and out of the page) while also rotating (e.g., tilting) about a Z direction. Further, Y channels 132 may also serve one or more structural purposes, such as providing strength and/or support to mechanism 101 while also allowing for movement or interaction of the carriers. Such that, to support movement of Y carrier 116 in a YZ direction, Y ball bearings 128 move within Y channels 132.

In addition, Y carrier 116 may be configured to move in a Z direction via Y ball bearings 128 (e.g., Y ball bearings 128 support movement of Y carrier 116 in a Z direction). In some examples, as Y carrier 116 moves in a Z direction, ball bearings 128A and 128B may roll within Z channels 130. Z channels 130 may be channels (e.g., passages or groves) in housing 102 that guide, direct, or accommodate Y ball bearings 128. Further, Z channels 130 may also serve one or more structural purposes, such as providing strength and/or support to mechanism 101 while also allowing for movement or interaction of the carriers. Such that, to support movement of Y carrier 116 in a Z direction, Y ball bearings 128 move within Z channels 130.

In this way, Y ball bearings 128 may support movement of Y carrier 116 in the YZ direction and Z direction. Whereas X ball bearings 126 may support movement of X carrier 120 in only the XZ direction.

In some examples, camera 100 may move Y carrier 116 in a Z direction to perform auto focus (AF). For instance, camera 100 may be capturing a photo or video of a scene (e.g., a flower in a field of grass). To capture a photo or video with sharp focus on the subject (e.g., the flower) of the scene, image sensor 124 may need to be moved up or down in the Z direction. Camera 100 may achieve this movement by implementing AF, where Y carrier 116 may move up and/or down in the Z direction before capturing the photo. This way camera 100 may produce a photo of the scene with the flower in focus. In this way, AF may contribute to providing an image without undesired effects (e.g. blur).

In one example, one or more components of the mobile computing device may collect distance, phase, and/or contrast information associated with the subject of the photo that camera 100 is capturing. Such that, one or more processors of the mobile computing device that includes camera 100 may cause Y carrier 116 to move, via Z coils 104 and Z magnets 106, in a Z direction to perform AF for OIS. In some examples, the centers of Y ball bearings 128 and the centers of X ball bearings 126 are coplanar for at least a portion of the performance of AF for OIS.

The length of Z channels 130 may generally serve as a boundary for how far Y carrier 116 may move in a Z direction. Such that, when Y ball bearings 128 reach the end of Z channel 130, Y carrier 116 may no longer move any further in that Z direction. The distance that Y carrier 116 may move in the Z direction may be illustrated by Z stroke 138.

In some examples, Z stroke 138 may correlate to the length of Z channels 130. Further, because X carrier 120 and Y carrier 116 are laterally stacked, the overall thickness (in the Z direction) of mechanism 101 may correlate to the length (e.g., thickness) of housing 102. As such, the overall thickness of mechanism 101 may correlate to how far in the Z direction Y carrier 116 is allowed to move.

FIG. 1B2 may be an example of FIG. 1B1 with curved (e.g., not straight) X channels 134 and curved stroke axes 135. Curved stroke axes 135 may illustrate that X ball bearings 126 may roll along a curved path within X channels 134. In some examples, each of X channels 134 may include same or different curved stroke axes 135. In one example, each of Y channels 132 may be curved and include curved stroke axes.

In the example illustrated by FIG. 1B2, angle 133 (e.g., the tilt of X channels 134) may be substantially similar to angle 133 of FIG. 1B1. In this way, X channels 134 or Y channels 132 may be curved with or without tilt to perform the techniques of this disclosure.

FIG. 1C shows a cross-sectional view of camera 100 on the Y-Z plane (e.g., along line B-B). Although line B-B of FIG. 1A goes through X ball bearings 126B and 126C, Y ball bearings 128B and 128C and Y carrier 116 are shown to help facilitate understanding. As illustrated by FIG. 1C, X carrier 120 may be laterally stacked within Y carrier 116.

X carrier 120 may carry PCB 122 (and thus image sensor 124). X carrier 120 may be configured to move in an XZ direction via X ball bearings 126 such that X carrier 120 may translate in an X direction (e.g., illustrated by FIG. 1C as in and out of the page) while also rotating (e.g., tilting) about a Z direction.

Y carrier 116 may carry X carrier 120 (and thus image sensor 124). Y carrier 116 may be configured to move in a YZ direction via Y ball bearings 128 (e.g., ball bearings 128 support movement of Y carrier 116 in a YZ direction). In some examples, as Y carrier 116 moves in a YZ direction, ball bearings 128B and 128C may roll within Y channels 132. Y channels 132 may be channels (e.g., passages or grooves) in Y carrier 116 that guide, direct, or accommodate Y ball bearings 128. Y channels 132 may be angled 131 (e.g., tilted) such that Y carrier 116 may translate in a Y direction while also rotating (e.g., tilting) about a Z direction. Y channels 132 may include stroke axes 135 that represent the path along which Y ball bearings 128 roll within Y channels 132. Angle 131, and thus stroke axes 135, may be different for each of Y channels 132. Further, Y channels 132 may also serve one or more structural purposes, such as providing strength and/or support to mechanism 101 while also allowing for movement or interaction of the carriers. Such that, to support movement of Y carrier 116 in a YZ direction, Y ball bearings 128 move within Y channels 132 along stroke axes 135.

The length of Y channels 132 may generally serve as a boundary for how far Y carrier 116 may move in a YZ direction. Such that, when Y ball bearings 128 reach the end of Y channel 132, Y carrier 116 may no longer move any further in that YZ direction. The distance that Y carrier 116 may move in a YZ direction may be illustrated by YZ stroke 142. In some examples, YZ stroke 142 may be associated with the length of Y channels 132 and/or the distance between a side of housing 102 and a side of Y carrier 116 (parallel and proximal to the side of housing 102).

In addition, Y carrier 116 may be configured to move in a Z direction via Y ball bearings 128 (e.g., Y ball bearings 128 support movement of Y carrier 116 in a Z direction). In some examples, as Y carrier 116 moves in a Z direction, ball bearings 128B and 128C may roll within Z channels 130 along stroke axes 129. Z channels 130 may be channels (e.g., passages or grooves) in housing 102 that guide, direct, or accommodate Y ball bearings 128. Further, Z channels 130 may also serve one or more structural purposes, such as providing strength and/or support to mechanism 101 while also allowing for movement or interaction of the carriers. Such that, to support movement of Y carrier 116 in a Z direction, Y ball bearings 128 move within Z channels 130.

In this way, Y ball bearings 128 may support movement of Y carrier 116 in the YZ direction and Z direction. Whereas X ball bearings 126 may support movement of X carrier 120 in only the XZ direction. Further, when Y carrier 116 moves in either the YZ direction or Z direction, X carrier 120 may move as well. In other words, when Y carrier 116 moves in the YZ direction, X carrier 120 may move in the YZ direction as well (e.g., albeit without movement in the XZ direction relative to housing 102, unless induced by X coil 112/X magnet 114). Thus, Y carrier 116 may perform sensor shift image stabilization by carrying X carrier 120 which carries image sensor 124.

Figure 2A:
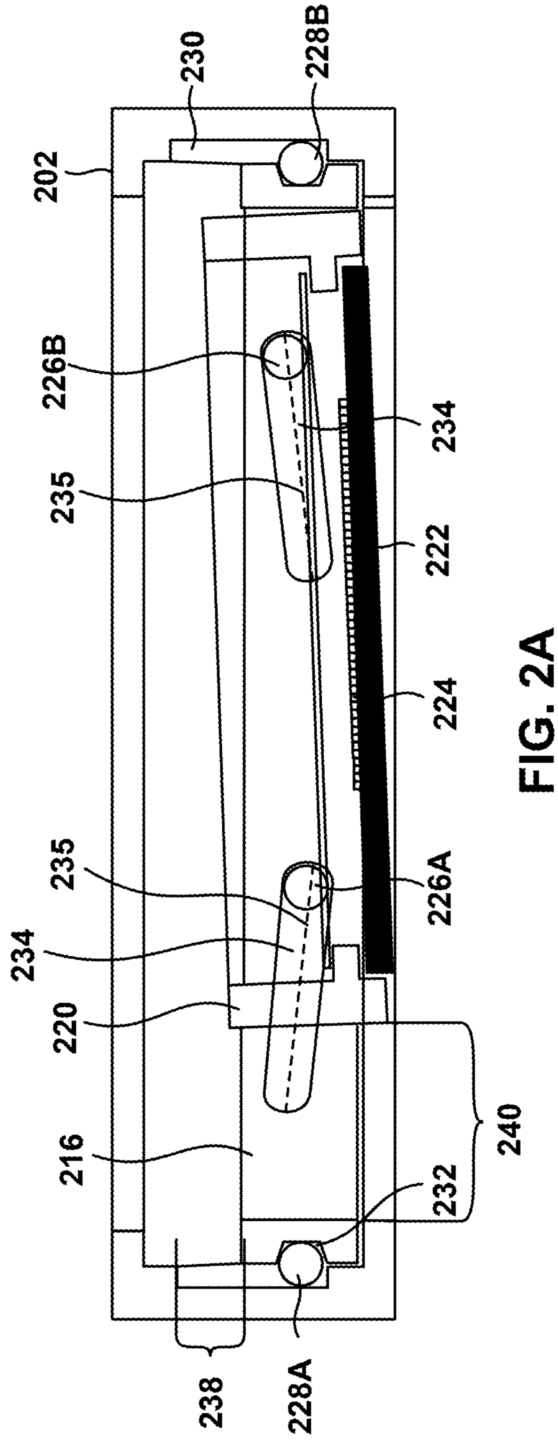
FIGS. 2A-2B are conceptual diagrams illustrating in further detail the mechanism for field curvature compensated sensor shift OIS, in accordance with one or more aspects of this disclosure.
Figure 2B:
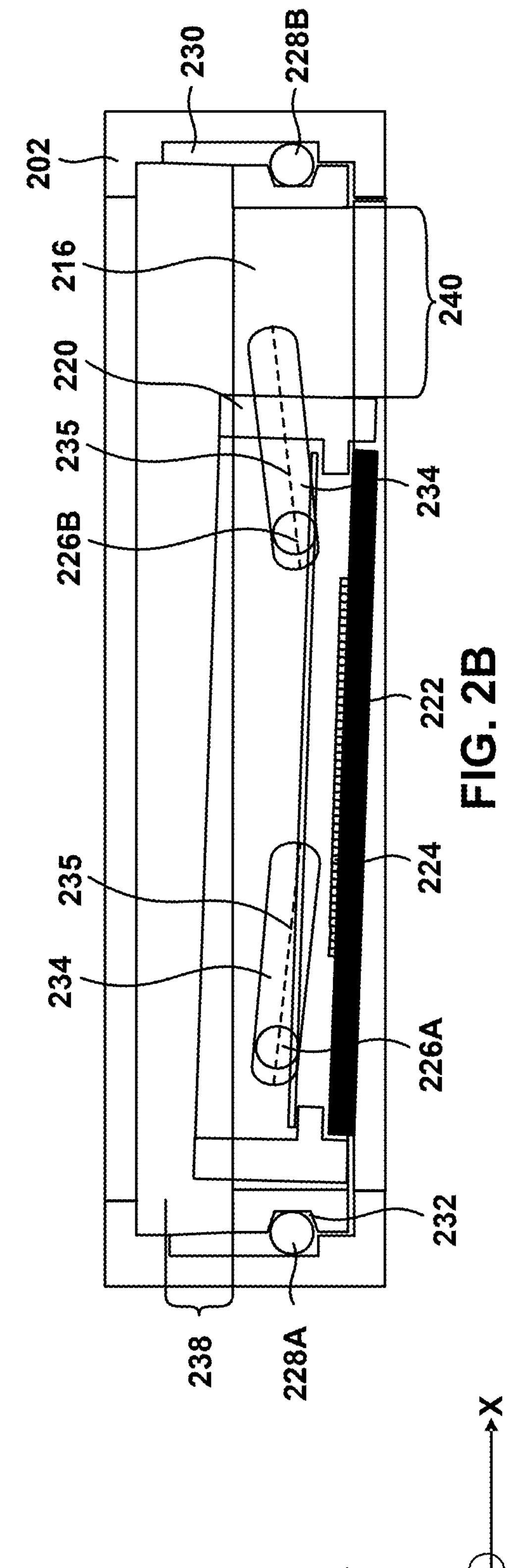

FIGS. 2A-2B are conceptual diagrams illustrating in further detail mechanism 101 for field curvature compensated sensor shift OIS, in accordance with one or more aspects of this disclosure. Specifically, FIGS. 2A-2B illustrate FIG. 1B in further detail (e.g., FIGS. 2A-2B illustrate a cross-sectional view of camera 100 on the X-Z plane, e.g., along line A-A of FIG. 1A). Although line A-A of FIG. 1A goes through Y ball bearings 128A and 128B, X ball bearings 226A and 226B and X carrier 220 are shown to help facilitate understanding. Further, FIGS. 2A-2B illustrate mechanical movement of camera 100.

FIGS. 2A-2B may include housing 202, Z stroke 238, Y ball bearings 228, Y carrier 216, Y channels 232, XZ stroke 240, X carrier 220, X channels 234, stroke axes 235, X ball bearings 226, image sensor 224, PCB 222, and Z channels 230. Housing 202, Z stroke 238, Y ball bearings 228, Y carrier 216, Y channels 232, XZ stroke 240, X carrier 220, X channels 234, stroke axes 235, X ball bearings 226, image sensor 224, PCB 222, and Z channels 230 may be examples of housing 102, Z stroke 138, Y ball bearings 128, Y carrier 116, Y channels 132, XZ stroke 140, X carrier 120, X channels 134, stroke axes 135, X ball bearings 126, image sensor 124, PCB 122, and Z channels 130 of FIGS. 1A-1C.

As illustrated by FIGS. 2A-2B, X carrier 220 may carry PCB 222 (and thus image sensor 224). X carrier 220 may be configured to move in an XZ direction via X ball bearings 226 (e.g., X ball bearings 226 support movement of X carrier 220 in an XZ direction). In some examples, as X carrier 220 moves in an XZ direction ball bearings 226A and 226B may roll within X channels 234. X channels 234 may be channels (e.g., passages or grooves) in Y carrier 216 that guide, direct, or accommodate X ball bearings 226. X channels 234 may be angled (e.g., tilted) such that X carrier 220 may translate in an X direction while also rotating (e.g., tilting) about a Z direction. X channels 234 may include stroke axes 235 that represent the path along which X ball bearings 226 roll within X channels 234. The angle at which X channels 234 are tilted, and thus stroke axes 235, may be different for each of X channels 234. In some examples, stroke axes 235 may not be straight (e.g., curved).

The length of X channels 234 may generally serve as a boundary for how far X carrier 220 may move in an XZ direction. Such that, when X ball bearings 226 reach the end of X channels 234, X carrier 120 may no longer move any further in that XZ direction. The distance that X carrier 220 may move in an XZ direction may be illustrated by XZ stroke 240. In some examples, XZ stroke 240 may be associated with the length and angle of X channels 234 and/or the distance between a side of Y carrier 216 and a side of X carrier 220 (parallel and proximal to the side of Y carrier 216).

In one example illustrated by FIG. 2A, camera 100 may move to the left while capturing a photo. One or more gyroscopes, accelerometers, and/or other components of the mobile computing device may collect motion data of camera 100. One or more processors may generate a signal, based on the motion data, and provide the signal to an X actuator. Typically, receipt of the signal may cause the X actuator to move X carrier 220 to the right along the X axis to counteract the movement of camera 100. However, planar movement to the right may increase distances between the image plane and portions of image sensor 224 capturing light, thus increasing the field curvature error. In accordance with one or more techniques of this disclosure, receipt of the signal may instead cause X actuator to move X carrier 220 in an XZ direction (e.g., X carrier 220 may translate to the right while also rotating (e.g., tilting) about a Z direction).

Similarly, FIG. 2B illustrates an example where camera 100 may move to the right while capturing a photo. One or more gyroscopes, accelerometers, and/or other components of the mobile computing device may collect motion data of camera 100. One or more processors may generate a signal, based on the motion data, and provide the signal to an X actuator. In accordance with one or more techniques of this disclosure, receipt of the signal may cause X actuator to move X carrier 220 in an XZ direction (e.g., X carrier 220 may translate to the left while also rotating (e.g., tilting) about a Z direction).

Rotating X carrier 220 may enable the plane of image sensor 224 to more closely match the image plane, thus decreasing distances between the image plane and image sensor. In this way, mechanism 101 may desirably reduce field curvature error while performing sensor shift OIS.

Figure 3:
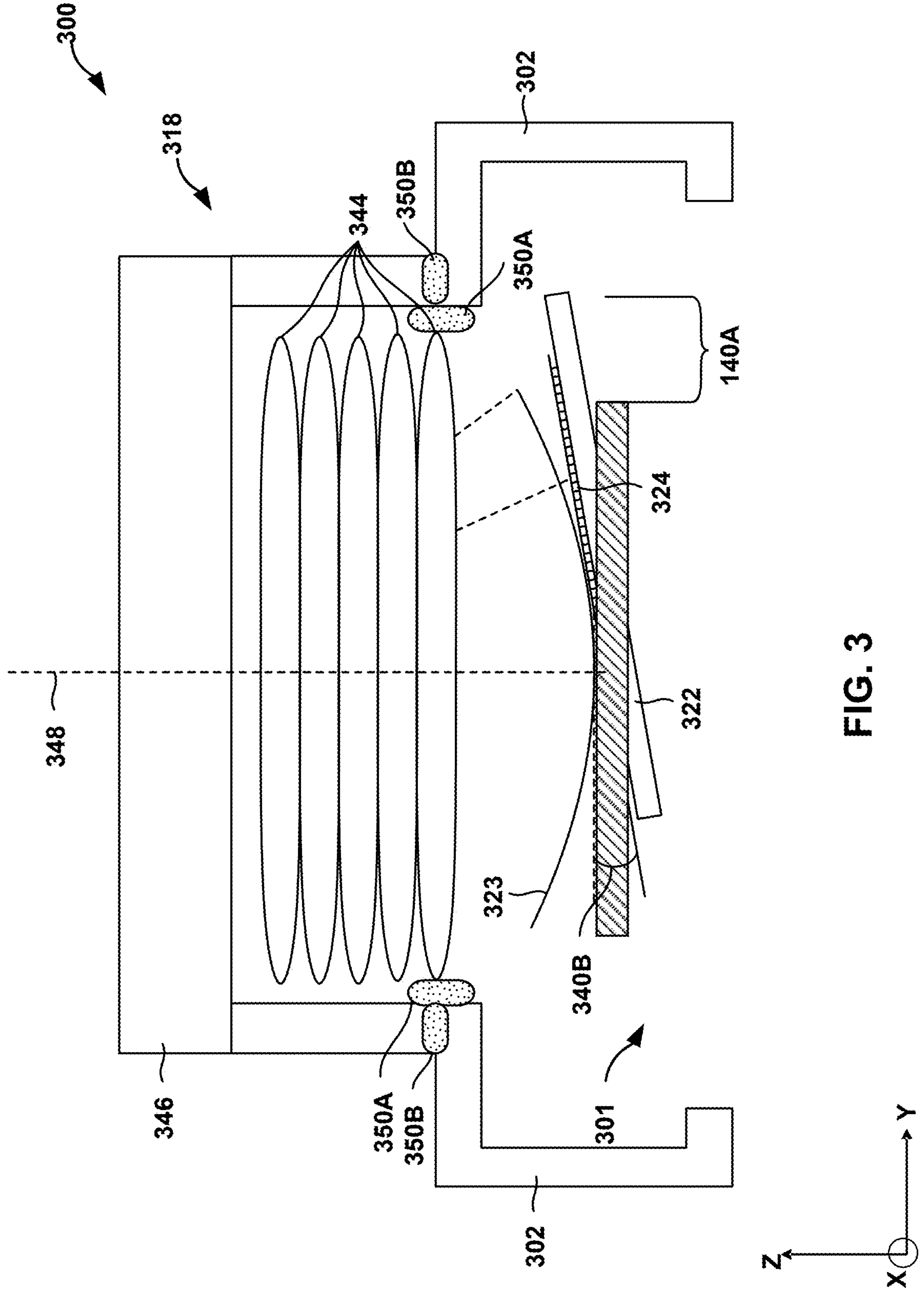
FIG. 3 is a conceptual diagram illustrating field curvature compensated sensor shift OIS, in accordance with one or more aspects of this disclosure.

FIG. 3 is a conceptual diagram illustrating field curvature compensated sensor shift OIS, in accordance with one or more aspects of this disclosure. Further, FIG. 3 is another view of camera 100 of FIG. 1A illustrated as including additional components. As shown in FIG. 3, camera 300 may include lens system 318. Further, FIG. 3 may include housing 302, mechanism 301, PCB 322, and image sensor 324. Camera 300, housing 302, mechanism 301, PCB 322, and image sensor 324 may respectively be examples of camera 100, housing 102, mechanism 101, PCB 122, and image sensor 124 of FIG. 1.

In the example shown, lens system 318 includes imaging lens 344 and variable aperture 346 and is attached to lens housing 302. Imaging lens defines optical axis 348 and is configured to image light to image sensor 324. Variable aperture 346 may be configured to open and close in order to change the clear aperture of imaging lens 344, e.g., variable aperture 346 may be a controllable iris configured to control the F-stop of imaging lens 344. Although shown as being positioned opposite imaging lens 344 from image sensor 324, variable aperture 346 may be internal to imaging lens 344, e.g., between lens elements of imaging lens 344.

In the example shown, both imaging lens 344 and variable aperture 346 are attached to housing 302, e.g., via fasteners 350A and 350B (collectively, fasteners 350). In some examples, imaging lens 344 may be attached to lens housing 302 and aperture 346 may be attached to imaging lens 344, or variable aperture 346 may be attached to housing 302 and imaging lens 344 may be attached to variable aperture 346. In some examples, fasteners 350 may be a mechanical fastener, an adhesive, a weld, or any suitable fastener configured to attach lens system 318 to housing 302. In some examples, fastener 350A may be different from 350B, e.g., a different fastener type such as mechanical, adhesive, weld, or the like, and in other examples fastener 350A may be the same or of the same type. For example, fasteners 350 may be a single fastener, such as when variable aperture 346 is integrated within or onto imaging lens 344. Lens system 318 and housing 302 are configured to remain stable, e.g., are not configured to be moved to perform optical image stabilization (OIS).

Due to curvature of imaging lens 344, imaging plane 323 (e.g., image plane 323) is also curved. Geometry of imaging lens 344 and PCB 322 (which includes image sensor 324) may be arranged such that before performing OIS (illustrated with diagonal lines) the curved imaging plane 323 is coincident with the sensor at an optical center (e.g., the point at which optical axis 348 meets image sensor 324). The curved imaging plane 323 may be vertically displaced from image sensor 324, with the displacement increasing with distance away from the optical center. This displacement between imaging plane 323 and image sensor 324 may result in field curvature error, which may degrade the quality of photos or video captured via imaging lens 344 (e.g., degrading sharpness along the corners of the photo or video).

Typically, to perform sensor shift OIS the image sensor may be shifted in planar directions (e.g., along the X, Y, and/or Z planes) to counteract movement of the camera. However, such typical designs for sensor shift OIS may increase distances between the optical center and portions of image sensor 324 capturing light, thus increasing field curvature error.

In accordance with one or more aspects of this disclosure, camera 300 may include mechanism 301 for field curvature compensated sensor shift OIS that compensates for field curvature error while providing OIS. For instance, in the example illustrated by FIG. 3, mechanism 101 may shift image sensor 324 to the right the necessary amount 140A to perform OIS while also rotating image sensor 324 the necessary amount 140B. By rotating image sensor 324, mechanism 301 may enable the plane of image sensor 324 to more closely match image plane 323 as image sensor 324 is shifted to the right (as illustrated by FIG. 3). More closely matching the plane of image sensor 324 to image plane 323 may decrease distances between image plane 323 and image sensor 324. In this way, mechanism 101 may desirably reduce field curvature error while performing sensor shift OIS.

FIGS. 4A-4C are conceptual diagrams illustrating an example mobile computing device, in accordance with one or more aspects of this disclosure. As shown in FIGS. 4A-4C, mobile computing device 450 may include camera module 400A and/or camera module 400B (collectively, "camera modules 400"). FIG. 4A may be a back view of mobile computing device 450, FIG. 4B may be a front view of mobile computing device 450, and FIG. 4C may be a side view of mobile computing device 450.

As shown in FIG. 4A, camera module 400A may be a rear-facing camera located on a back of mobile computing device 450 that may include processing circuitry 410 (e.g., one or more processors) coupled to a memory 408. Memory 408 may be configured to store program instructions and/or data accessible by processing circuitry 410. Memory 408 may be implemented using any suitable memory technology, such as static random access memory (SRAM), synchronous dynamic RAM (SDRAM), nonvolatile/flash-type memory, or any other type of memory. Program instructions may be configured to implement various interfaces, methods and/or data for controlling operations of one or more of camera modules 400 and for capturing and processing images with one or more of camera modules 400 or other methods or data, for example interfaces and methods for capturing, displaying, processing, and storing images captured with one or more of camera modules 400. In some examples, program instructions and/or data may be received, sent or stored upon different types of computer-accessible media or on similar media separate from memory 408 or mobile computing device 450.

In some examples, memory 408 may include program instructions which may be processor-executable to implement any element or action to support camera modules 400, including but not limited to image processing software and interface software for controlling camera modules 400. In some examples, images captured by camera modules 400 may be stored to memory 408. In addition, metadata for images captured by camera modules 400 may be stored using memory 408.

In operation, processing circuitry 410 may control operation of camera 400A. For instance, processing circuitry 410 may output signals that control operation of actuators of camera 400A (e.g., to perform OIS and/or AF).

As shown in FIG. 4B, camera module 400B may be a front facing camera located on a front of mobile computing device 450. For instance, camera module 400B may be a through-display or hole-punch camera located at display 452 of mobile computing device 450.

One or both of camera module 400A and/or 400B may be examples of camera module 100 of FIGS. 1A-1C. For instance, one or both of camera module 400A and/or 400B may include a mechanism that performs sensor shift optical image stabilization (e.g., similar to mechanism 101 of FIGS. 1A-1C).

In operation, mobile computing device 450 may move (e.g., due to being held in unsteady hands, on a moving vehicle, etc.) while one of camera modules 400A or 400B is capturing a photo or video. The movement of camera modules 400A or 400B may cause undesirable effects to the photo or video (e.g., blur). To counteract the movement of camera modules 400A or 400B and prevent the undesirable effects, the mechanism(s) of camera modules 400A or 400B may perform OIS, specifically sensor shift image stabilization (e.g., based on signals received from processing circuitry 410).

In accordance with one or more aspects of this disclosure, the mechanism(s) of camera modules 400A or 400B may include an X carrier (e.g., similar to X carrier 120 of FIGS. 1A-1C) laterally stacked with a Y carrier (e.g., similar to Y carrier 116 of FIGS. 1A-1C). Each carrier may include designated ball bearings, channels, magnets, and coils that facilitate movement in the carrier's respective direction(s). In one example, the X carrier may move an image sensor (e.g., similar to image sensor 124 of FIGS. 1A-IC) in an XZ direction within the Y carrier via ball bearings moving within the channels. In another example, the Y carrier may move in a YZ direction within a housing (e.g., similar to housing 102 of FIGS. 1A-IC) via ball bearings moving within the channels. In some examples, because the X carrier is laterally stacked within the Y carrier and attached to the Y carrier via ball bearings, when the Y carrier moves in the YZ direction the image sensor moves in the YZ direction as well. The channels may include stroke axes that are not parallel to the plane of the image sensor, such that the mechanisms of camera modules 400A or 400B may translate the image sensor via the carriers in one or more planar directions (e.g., along an X and Y axis) while also rotating the image sensor (e.g., tilting the image sensor along the Z axis). By rotating the image sensor, the plane of the image sensor may more closely match the image plane. More closely matching the plane of the image sensor with the image plane may decrease distances between the image plane and the image sensor. In this way, aspects of the disclosure may desirably reduce field curvature error.

Figure 5:
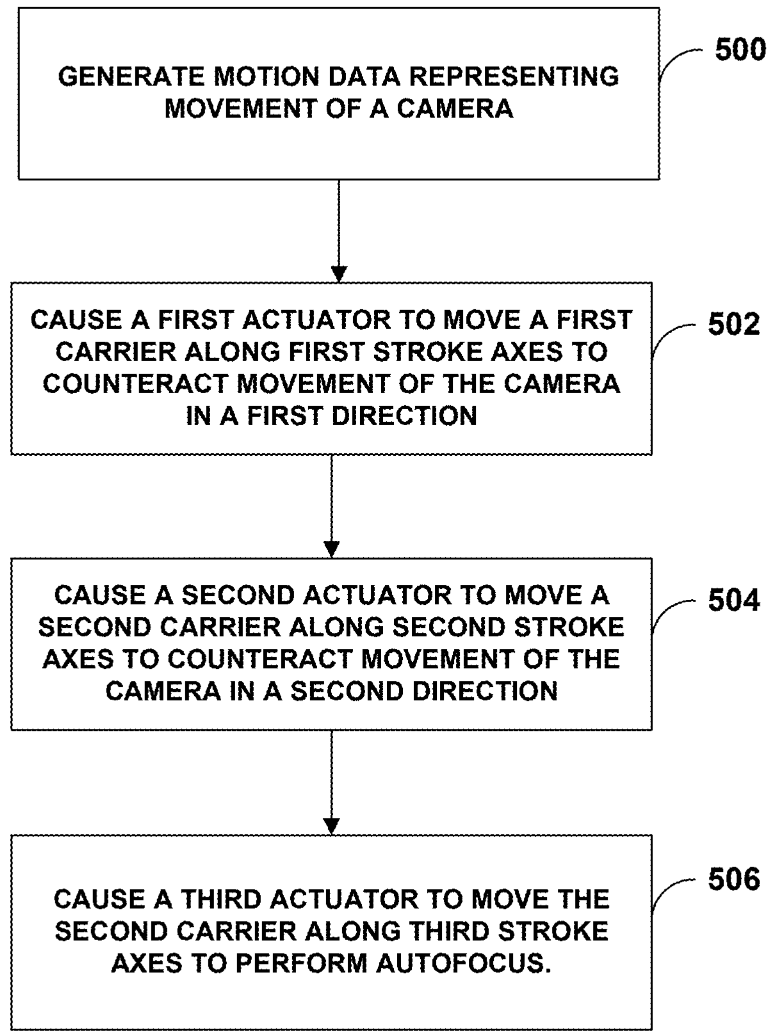
FIG. 5 is a flowchart illustrating an example mode of operation of an example camera that performs field curvature compensated sensor shift OIS, in accordance with one or more aspects of this disclosure.

FIG. 5 is a flowchart illustrating an example mode of operation of an example camera that performs field curvature compensated sensor shift OIS, in accordance with one or more aspects of this disclosure. Although the example operation of FIG. 5 is described as being performed by camera 100 of FIGS. 1A-1C, in other examples some or all of the example operations may be performed by another camera.

Undesirable photo or video effects (e.g., blur) may occur because of the movement of camera 100. To prevent these effects, in response to the movement of camera 100, mechanism 101 may perform OIS. For instance, mechanism 101 may move (i.e., shift) a position of image sensor 124 to compensate for movement of camera 100 relative to the photo or video being captured via camera 100.

One or more components may generate motion data representing movement of camera 100 (300). For instance, one or more of a gyroscope, an accelerometer, or other sensors may generate motion data representing movement of camera 100 in an X direction and motion data representing movement of camera 100 in a Y direction while camera 100 is capturing a photo or video.

One or more processors of camera 100, or a host device, may process the motion data and control operation of actuators of camera 100 to perform OIS. As one example, the one or more processors may cause a first actuator to move a first carrier of camera 100 along first stroke axes to counteract movement of camera 100 in a first direction. For instance, responsive to the motion data representing movement of camera 100 in the first direction indicating that camera 100 is moving in the positive X direction, the one or more processors may output a signal that causes the first OIS actuator to move the first carrier along the first stroke axes in the negative X direction. The first actuator may include a first coil attached to the first carrier and a first magnet attached to a second carrier.

As another example, the one or more processors may cause a second actuator to move the second carrier of camera 100 in along second stroke axes to counteract movement of camera 100 in a second direction (304). For instance, responsive to the motion data representing movement of camera 100 in the second direction indicating that camera 100 is moving in the negative Y direction, the one or more processors may output a signal that causes the second OIS actuator to move the second carrier along the second stroke axes in the positive Y direction. The second actuator may include a second coil attached to a camera housing and a second magnet attached to the second carrier. Movement of the second carrier may cause movement of the first carrier and the image sensor.

In some examples, camera 100 may further perform autofocus. For example, the one or more processors may cause a third actuator to move the second carrier of camera 100 along third stroke axes to perform autofocus (306). For instance, the one or more processors may output a signal that causes the third OIS actuator to apply forces to move the second carrier along the third stroke axes in the Z direction. The third stroke axes may correspond to a third plurality of channels included in the camera housing. The third stroke axes may be substantially perpendicular to a plane of the image sensor. The third actuator may include at least one coil of a plurality of coils attached to the camera housing and at least one magnet of a plurality of magnets attached to the second carrier. Each magnet of the plurality of magnets may correspond to a coil of the plurality of coils.

In some examples, the first stroke axes and second stroke axes may be curved or straight and the first stroke axes and the second stroke axes may be tilted at different angles. In one example, a plurality of the first stroke axes are tilted at different angles and a plurality of the second stroke axes are tilted at different angles. For instance, a first stoke axis of the first stroke axes may be tilted at a positive or negative 5 degree angle with respect to a plane of the image sensor and a second stroke axis of the first stroke axes may be tilted at a positive or negative 10 degree angle with respect to the plane of the image sensor.

Movement of the first carrier along the first stroke axis may be supported by a first plurality of objects, movement of the second carrier along the second stroke axes may be supported by a second plurality of objects, and movement of the second carrier along the third stroke axes may be supported by the second plurality of objects. The first and second plurality of objects may each comprise at least one object that is a shaft or a ball bearing. Further, the first plurality of objects and the second plurality of objects may each include four objects.

The following numbered examples may illustrate one or more aspects of this disclosure:

Example 1. A device comprising: a camera housing; a first carrier; an image sensor carried by the first carrier; a second carrier, wherein: the first carrier is attached to the second carrier via a first plurality of objects that move within a first plurality of channels having first stroke axes that are not parallel to a plane of the image sensor, and the second carrier is attached to the camera housing via a second plurality of objects that move within a second plurality of channels having second stroke axes that are not parallel to both the plane of the image sensor and the first stroke axes; and one or more optical image stabilization (OIS) actuators configured to apply forces to move the first carrier along the first stroke axes and move the second carrier along the second stroke axes.

Example 2. The device of example 1, wherein the first stroke axes and the second stroke axes are straight.

Example 3. The device of example 1 or example 2, wherein the first stroke axes and the second stroke axes are curved.

Example 4. The device of example 1, wherein the first plurality of objects and the second plurality of objects each comprise a shaft.

Example 5. The device of example 1 or example 4, wherein the first plurality of objects and the second plurality of objects each comprise a ball bearing.

Example 6. The device of examples 1-3, wherein the first stroke axes and the second stroke axes are tilted at different angles.

Example 7. The device of examples 1-3 or example 6, wherein a particular first stroke axis of the first stroke axes is tilted at a different angle than another first stroke axis of the first stroke axes, and wherein a particular second stroke axis of the second stroke axes is tilted at a different angle than another second stroke axis of the second stroke axes.

Example 8. The device of examples 1-7, wherein movement of the first carrier along the first stroke axes is supported by the first plurality of objects, and wherein movement of the second carrier along the second stroke axes is supported by the second plurality of objects.

Example 9. The device of example 1, further comprising: one or more processors configured to: perform OIS, wherein to perform OIS, the one or more processors are configured to: cause, based on sensor data indicating movement of the device in a first direction, a first actuator of the one or more OIS actuators to move the first carrier along the first stroke axes; and cause, based on sensor data indicating movement of the device in a second direction, a second actuator of the one or more OIS actuators to move the second carrier along the second stroke axes.

Example 10. The device of example 9, wherein one or both of: the first actuator comprises: a first coil attached to the first carrier; and a first magnet attached to the second carrier; and the second actuator comprises: a second coil attached to the camera housing; and a second magnet attached to the second carrier.

Example 11. The device of example 1, wherein the camera housing further comprises a third plurality of channels having third stroke axes that are substantially perpendicular to the plane of the image sensor, and wherein the second plurality of objects are further configured to move within the third plurality of channels.

Example 12. The device of example 11, wherein the one or more optical image stabilization (OIS) actuators are further configured to apply forces to move the second carrier along the third stroke axes.

Example 13. The device of example 12, wherein movement of the second carrier along the third stroke axes is supported by the second plurality of objects.

Example 14. The device of example 12 or example 13, further comprising: one or more processors configured to: perform autofocus, wherein to perform autofocus, the one or more processors are configured to: cause a third actuator of the one or more OIS actuators to apply forces to move the second carrier along the third stroke axes.

Example 15. The device of example 14, wherein the third actuator comprises: at least one coil of a plurality of coils attached to the camera housing; and at least one magnet of a plurality of magnets attached to the second carrier, wherein each magnet of the plurality of magnets corresponds to a coil of the plurality of coils.

Example 16. The device of examples 1-15, wherein movement of the second carrier causes movement of the first carrier and the image sensor.

Example 17. The device of examples 1-16, wherein the first plurality of objects comprises four objects, and wherein the second plurality of objects comprises four objects.

Example 18. A method comprising: receiving, by one or more optical image stabilization (OIS) actuators and based on sensor data indicating movement of a device, a signal; and applying, by the one or more OIS actuators and based on the signal, one or more forces to move one or both of a first carrier and a second carrier, wherein: movement of one or both of the first carrier and the second carrier comprises both planar and rotational movement of an image sensor, the image sensor is attached to and carried by the first carrier, the first carrier is attached to the second carrier via a first plurality of objects that move within a first plurality of channels having first stroke axes that are not parallel to a plane of the image sensor, the second carrier is attached to the camera housing via a second plurality of objects that move within a second plurality of channels having second stroke axes that are not parallel to both the plane of the image sensor and the first stroke axes, and the first carrier moves along the first stroke axes and the second carrier moves along the second stroke axes.

Example 19. The method of example 18, wherein the first stroke axes and the second stroke axes are straight.

Example 20. The method of example 18 or example 19, wherein the first stroke axes and the second stroke axes are curved.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A device comprising:

a camera housing;

a first carrier;

an image sensor carried by the first carrier;

a second carrier, wherein:

the first carrier is attached to the second carrier via a first plurality of objects that move within a first plurality of channels having first stroke axes that are not parallel to a plane of the image sensor, and the second carrier is attached to the camera housing via a second plurality of objects that move within a second plurality of channels having second stroke axes that are not parallel to both the plane of the image sensor and the first stroke axes; and one or more optical image stabilization (OIS) actuators configured to apply forces to move the first carrier along the first stroke axes and move the second carrier along the second stroke axes.

2. The device of claim 1, wherein the first stroke axes and the second stroke axes are straight.

3. The device of claim 1, wherein the first stroke axes and the second stroke axes are curved.

4. The device of claim 1, wherein the first plurality of objects and the second plurality of objects each comprise a shaft.

5. The device of claim 1, wherein the first plurality of objects and the second plurality of objects each comprise a ball bearing.

6. The device of claim 1, wherein the first stroke axes and the second stroke axes are tilted at different angles.

7. The device of claim 6, wherein a particular first stroke axis of the first stroke axes is tilted at a different angle than another first stroke axis of the first stroke axes, and wherein a particular second stroke axis of the second stroke axes is tilted at a different angle than another second stroke axis of the second stroke axes.

8. The device of claim 1, wherein movement of the first carrier along the first stroke axes is supported by the first plurality of objects, and wherein movement of the second carrier along the second stroke axes is supported by the second plurality of objects.

9. The device of claim 1, further comprising:

one or more processors configured to:

perform OIS, wherein to perform OIS, the one or more processors are configured to:

cause, based on sensor data indicating movement of the device in a first direction, a first actuator of the one or more OIS actuators to move the first carrier along the first stroke axes; and cause, based on sensor data indicating movement of the device in a second direction, a second actuator of the one or more OIS actuators to move the second carrier along the second stroke axes.

10. The device of claim 9, wherein one or both of:

the first actuator comprises:

a first coil attached to the first carrier; and a first magnet attached to the second carrier; and the second actuator comprises:

a second coil attached to the camera housing; and a second magnet attached to the second carrier.

11. The device of claim 1, wherein the camera housing further comprises a third plurality of channels having third stroke axes that are substantially perpendicular to the plane of the image sensor, and wherein the second plurality of objects are further configured to move within the third plurality of channels.

12. The device of claim 11, wherein the one or more optical image stabilization (OIS) actuators are further configured to apply forces to move the second carrier along the third stroke axes.

13. The device of claim 12, wherein movement of the second carrier along the third stroke axes is supported by the second plurality of objects.

14. The device of claim 13, further comprising:

one or more processors configured to:

perform autofocus, wherein to perform autofocus, the one or more processors are configured to:

cause a third actuator of the one or more OIS actuators to apply forces to move the second carrier along the third stroke axes.

15. The device of claim 14, wherein the third actuator comprises:

at least one coil of a plurality of coils attached to the camera housing; and at least one magnet of a plurality of magnets attached to the second carrier, wherein each magnet of the plurality of magnets corresponds to a coil of the plurality of coils.

16. The device of claim 1, wherein movement of the second carrier causes movement of the first carrier and the image sensor.

17. The device of claim 1, wherein the first plurality of objects comprises four objects, and wherein the second plurality of objects comprises four objects.

18. A method comprising:

receiving, by one or more optical image stabilization (OIS) actuators and based on sensor data indicating movement of a device, a signal; and applying, by the one or more OIS actuators and based on the signal, one or more forces to move one or both of a first carrier and a second carrier, wherein:

movement of one or both of the first carrier and the second carrier comprises both planar and rotational movement of an image sensor, the image sensor is attached to and carried by the first carrier, the first carrier is attached to the second carrier via a first plurality of objects that move within a first plurality of channels having first stroke axes that are not parallel to a plane of the image sensor, the second carrier is attached to the camera housing via a second plurality of objects that move within a second plurality of channels having second stroke axes that are not parallel to both the plane of the image sensor and the first stroke axes, and the first carrier moves along the first stroke axes and the second carrier moves along the second stroke axes.

19. The method of claim 18, wherein the first stroke axes and the second stroke axes are straight.

20. The method of claim 18, wherein the first stroke axes and the second stroke axes are curved.

* * * * *